(12) United States Patent
Lüchinger et al.

(10) Patent No.: US 8,299,375 B2
(45) Date of Patent: Oct. 30, 2012

(54) DRAFT PROTECTION DEVICE FOR A LABORATORY INSTRUMENT, PROVIDING A WEIGHING COMPARTMENT OF ADJUSTABLE VOLUME

(75) Inventors: Paul Lüchinger, Uster (CH); Sandra Ehrbar, Gutenswil (CH)

(73) Assignee: Mettler-Toledo AG, Greifensee (CH)

( * ) Notice: Subject to any disclaimer, the term of this patent is extended or adjusted under 35 U.S.C. 154(b) by 324 days.

(21) Appl. No.: 12/778,242

(22) Filed: May 12, 2010

(65) Prior Publication Data

US 2010/0288660 A1    Nov. 18, 2010

(30) Foreign Application Priority Data

May 13, 2009 (EP) .................................... 09160136

(51) Int. Cl.
*G01G 21/28* (2006.01)
*E05D 15/06* (2006.01)

(52) U.S. Cl. ............ 177/180; 177/238; 49/404; 49/409; 361/600; 361/679.1; 174/50; 312/138.1

(58) Field of Classification Search ................ 177/180, 177/191, 238, 181; 49/404, 409; 361/600, 361/679.1; 174/50; 312/138.1, 139.1, 139.2
See application file for complete search history.

(56) References Cited

U.S. PATENT DOCUMENTS

| | | | |
|---|---|---|---|
| 4,644,095 A * | 2/1987 | Bright et al. | 174/50 |
| 4,700,793 A | 10/1987 | Lüchinger | |
| 6,566,614 B1 * | 5/2003 | Fluckiger et al. | 177/180 |
| 6,603,081 B2 | 8/2003 | Lüchinger | |
| 6,657,861 B2 * | 12/2003 | Irmer | 361/695 |
| 6,686,545 B2 | 2/2004 | Lüchinger et al. | |
| 6,912,349 B2 * | 6/2005 | Clark et al. | 385/134 |
| 7,960,658 B2 * | 6/2011 | Mock | 177/126 |
| 2002/0038567 A1 | 4/2002 | Luchinger | |
| 2002/0040814 A1 | 4/2002 | Luchinger et al. | |
| 2002/0040815 A1 | 4/2002 | Luchinger | |
| 2006/0016134 A1 | 1/2006 | Luchinger et al. | |
| 2010/0000802 A1 * | 1/2010 | Izumo et al. | 177/181 |

FOREIGN PATENT DOCUMENTS

| | | |
|---|---|---|
| EP | 1355032 A2 | 10/2003 |
| FR | 2672482 A1 | 8/1992 |

* cited by examiner

*Primary Examiner* — Randy W Gibson
(74) *Attorney, Agent, or Firm* — Standley Law Group LLP

(57) ABSTRACT

A draft protection device for a laboratory instrument according to the invention encloses a weighing compartment that surrounds a balance pan and includes a rear wall, a front wall, two sidewalls, a top cover with at least one opening, and a floor that is delimited by border edges. The top cover is connected at least to one of the two sidewalls and/or the front wall and/or the rear wall in an arrangement where the top cover and the walls connected thereto are vertically movable together in relation to the balance pan. In addition, the vertically movable wall(s) are vertically moveable past the adjacent border edge(s) of the floor. In any vertical position of the top cover, at least one of the sidewalls is horizontally slidable relative thereto.

27 Claims, 7 Drawing Sheets

DRAFT PROTECTION DEVICE FOR A LABORATORY INSTRUMENT, PROVIDING A WEIGHING COMPARTMENT OF ADJUSTABLE VOLUME

CROSS-REFERENCE TO RELATED APPLICATIONS

This application is entitled to, and claims, benefit of a right of priority under 35 USC §119 from European patent application 09160136.9, filed on 13 May 2009, the content of which is incorporated by reference as if fully recited herein.

TECHNICAL FIELD

The present invention is directed to a draft protection device for a laboratory instrument. More particularly, the present invention is directed to a draft protection device that includes at least one upright wall and a top cover that together cooperate to enclose a weighing compartment surrounding a balance pan.

BACKGROUND

Laboratory instruments of a kind discussed herein serve, for example, as analytical balances in many fields of industry. Such fields of industry may include, without limitation, laboratories of research and development departments, as well as production areas (e.g., for quality control).

One exemplary analytical balance with a weighing compartment is described in detail in U.S. Pat. No. 4,700,793 A. Generally speaking, analytical balances are balances with a very high resolution of the measurement result. Consequently, even the smallest extraneous factors acting on the object being weighed or on the load receiver of the balance can introduce an error in the weighing result. The extraneous influence factors are rarely stable and this can lead to a situation where the precise weight of the weighing object cannot be determined. To protect the weighing system from being influenced by the environment, a weighing compartment is therefore commonly enclosed with a so-called draft shield.

As shown in U.S. Pat. No. 4,700,793 A, the typical draft shield of an analytical balance has in most cases two slidable sidewalls and sometimes also a slidable top cover, as the object to be weighted is normally delivered to the load receiver of the balance from the side, and sometimes also from above. A front wall of the draft shield is normally rigidly connected to the housing of the balance and, by functioning as a structural support, lends stability to the draft shield. The draft shield needs to be as tightly closed and solid as possible, so that air drafts of the ambient atmosphere cannot propagate into the weighing compartment through gaps and openings of the draft shield and cause atmospheric disturbances in the weighing compartment.

In order to make the weighing compartment, and in particular, the sidewalls of the draft shield easier to clean, a draft shield is proposed in U.S. Pat. No. 6,686,545 B2 whose front wall and sidewalls can be released from a form-fitting seat through a tilting movement and subsequently removed from the balance by a pulling movement. The top cover is connected through a linear guiding constraint to the balance housing, which serves as rear wall and can be slid horizontally over the balance housing, whereby the draft shield is opened at the top. In addition, the top cover, too, can be separated from the linear guiding constraint by means of a tilting movement.

It is further known in practice that the volume of the weighing compartment can limit the precision of a balance. The reason for this is that the enclosed air in a large weighing compartment is influenced much more strongly by the environment outside of the draft shield, for example by the incoming heat and light radiation. Further, in a large weighing compartment there are, in proportion to the enclosed volume, fewer surfaces slowing the air movement, for example after the sidewall has been closed. It therefore helps if the weighing compartment has a small volume in order for the air inside the weighing compartment to come to rest very quickly. Furthermore, the air in a weighing compartment of limited height is shifted about only to a minimal extent and it takes only a relatively short time for the air inside the weighing compartment to settle into a stable temperature profile over the height of the weighing compartment.

With the introduction of time-optimized work procedures, it occurs more often that different operations are performed at the same time or one after another directly in the weighing compartment without putting the object to be weighed on and off the load receiver several times. This is the case in particular in the preparation of solutions or powder mixtures.

The arrangement of a such multi-functional weighing compartment is disclosed for example in U.S. Pat. No. 6,603,081 B2. As shown therein, a multitude of accessories such as, for example, dosage-dispensing units, holder devices for source containers and receiving containers, protective covers, indicators and the like, can be installed temporarily in an arrangement that is optimized for a specific sequence of operations. Among the illustrated examples is an intermediate floor with a passage opening which can be fastened at an appropriate height dependent on the weighing container that is to be set on the balance pan. Thus, an analytical balance that was originally designed only for determining the mass of weighing objects is turned into a multi-functional laboratory instrument.

Although the intermediate floor which is disclosed in U.S. Pat. No. 6,603,081 B2 allows the volume of the weighing compartment to be partitioned and thus to be partially reduced, due to the existing draft shield the access to the opening in the intermediate floor and thus to the weighing compartment is strongly restricted by the protruding walls. Furthermore, it takes a certain amount of time to change the position of the intermediate floor. If the balance is used for example in a so-called glovebox, it can be extraordinarily difficult to raise or lower the intermediate floor.

However, the increase in functionality and the requirement for higher precision of the laboratory instruments of the foregoing description must not be allowed to restrict their user friendliness. The present invention is therefore directed to a draft shield for a laboratory instrument, which offers improved access to the weighing compartment while keeping the weighing compartment adaptable to the height of the weighing container.

SUMMARY OF THE GENERAL INVENTIVE CONCEPT

A draft protection device for a laboratory instrument according to the present invention encloses a weighing compartment that surrounds a balance pan. Such a device preferably includes a rear wall, a front wall, two sidewalls, a top cover with at least one opening, and a floor that is delimited by border edges. The top cover is connected at least to one of the two sidewalls and/or the front wall and/or the rear wall. The top cover and the walls connected thereto are vertically movable together in relation to the balance pan. The walls, as the term is used in the present description, include at least one sidewall, front wall or rear wall. In addition, the vertically movable sidewall and/or the front wall and/or the rear wall can be moved vertically past the adjacent border edge of the floor. Also, in any vertical position of the top cover at least one sidewall is horizontally slidable relative to the top cover. Further, at least the rear wall can be designed as two panels, with a first rear wall panel being connected to the top cover and a second rear wall panel being connected to the floor, wherein the two panels have facing sides that lie against each other and thus partially overlap each other, and wherein the two panels are slidable relative to each other.

This draft protection device has the advantage that its height can be adapted to various receiving containers that may be placed on the balance pan, without making it at the same time more difficult to gain access to the weighing compartment and to the area above the top cover. Free access to the area above the top cover is maintained by providing that at least one wall is vertically slidable together with the top cover. As a result, the top edge of the wall that moves vertically with the top cover remains always at the same level with the top cover, while the top edges of the walls that are not connected to the top cover always remain at the same vertical distance from the floor. Accordingly, it is also possible for additional accessory devices to reach into or be arranged in the area above the top cover, since not all of the walls extend with their top edges above the top cover, whereby the access to these accessories would be compromised or even prevented.

As a further advantage, the balance pan which is arranged in the weighing compartment can always be reached conveniently through at least one horizontally slidable sidewall. This access to the weighing compartment allows receiving containers to be placed and removed from the balance pan in the easiest way possible. As a consequence of this lateral access, the draft shield does not need to be disassembled to permit container access, nor is it necessary to change the height setting of the draft shield. Of course, the latter statement applies only as long as receiving containers of equal height continue to be used.

Maintaining access to the area above the top cover is important as the latter has at least one opening through which, for example, dosage material can be filled into the receiving container. As a result of adjusting the height of the weighing compartment to a receiving container placed on the balance pan, there may not be enough space left to reach the fill opening of the receiving container. The dispensing of the material through the opening of the top cover can be performed by means of a dosage-dispensing device or by hand.

When using a dosage-dispensing device that is arranged above the top cover and whose functional unit, for example a drive- and control unit, is arranged behind the rear wall, it is preferably the rear wall that is vertically slidable together with the top cover. If the dispensing of the dosage material is to be performed manually, then it is preferable if at least the front wall is connected to the top cover and vertically movable together with the latter, and even better if the front wall and both sidewalls are connected to and movable with the top cover. Accordingly, the console housing or the supporting surface of a laboratory instrument that is equipped with the draft shield according to the present invention should be designed in such a way that nothing blocks movement of the walls when they are slid up or down relative to the balance pan.

In a further embodiment, the top cover includes a top cover frame and a top cover insert, wherein the at least one opening is arranged in the top cover insert. Accordingly, the at least one sidewall and/or the front wall and/or the rear wall are connected to the top cover frame. According to the invention, the top cover frame together with the top cover insert and the walls that are connected to the top cover frame are vertically slidable in relation to the balance pan. In addition, the top cover insert is horizontally slidable relative to the top cover frame. As a result, the balance pan can also be loaded and unloaded from above. Further, a dosage-dispensing device can also be connected to the top cover insert and can thus be horizontally slidable relative to the top cover frame.

In order to optimize the accessibility of the weighing compartment and the top cover, both of the sidewalls are preferably connected to the top cover or, if applicable, to the top cover frame, and horizontally slidable relative to the top cover.

To make the weighing compartment and the draft protection device easier to clean, at least one sidewall and/or the front wall preferably have a releasable connection to the top cover or, if applicable, to the top cover frame. If desired, the top cover insert can be configured so that it can be loosely set into the top cover frame. The cleaning process can thereby be simplified significantly, either by the mere fact that this makes the top cover insert easier to clean, or that it could even be designed as a throw-away part. Of course, the same also applies to the floor. The latter can further be divided into two parts, so that the balance pan does not have to be taken out in order to remove the floor. Below the balance pan and the floor, there can further be a catch tray for spilled dosage material of the dosage-dispensing device.

As already described above, the top cover has at least one opening. As a possible feature, this opening can be closed by a slider that is arranged in the top cover.

To guide the horizontal movement of the at least one sidewall that is connected to the top cover, there can be at least one guide rail arranged at the top cover or, if applicable, at the top cover frame. Furthermore, the slidable sidewall may comprise at least one guide element which is guided along the guide rail.

Given that a draft protection device should as much as possible keep out all air movements that are present in the environment of the laboratory instrument, it is of advantage if a sealing glide strip, sealing brush or sealing roller extending at least over the length of the border edge is arranged along at least one border edge of the floor. This serves to seal a possibly existing gap between the border edge of the floor and the sidewall while allowing the sidewall to glide smoothly over the border edge. For sidewalls with a particularly damage-prone surface, for example coated glass panels, one could also use a sealing roller, which rolls on the sidewall when the latter is moved vertically, and which has sufficiently smooth-gliding surface properties for a horizontal movement of the sidewall. Should these measures still be inadequate, one could of course also arrange a supporting roller ball or a row of roller balls along the border edge of the floor, so that independently of the direction of the movement there is never a sliding contact movement taking place between the roller balls and the sidewall because the direction of the rotary movement of the roller balls adapts itself to the movement of the sidewall. In such an embodiment, the gaps between the individual roller balls or the recesses between their contact points with the sidewalls should be sufficiently filled out, for example with brush segments or sealing strip segments, so that no gap or only an extremely small gap remains between two neighboring roller balls and the sidewall that lies against the roller balls.

There can further be at least one drive mechanism to power the vertical and/or horizontal movement of the wall and/or cover. Preferably however, there is at least one drive mechanism that serves for the vertical movement of the top cover and the wall that is connected thereto, while a further drive mechanism provides the horizontal movement of at least one sidewall. The drive mechanisms may be connected to a control device which that may be operated by a person by way of an input unit.

When particularly small weighing containers are used, the top cover can be so close to the floor of the weighing compartment that it becomes almost impossible to change the weighing container. For increased operating convenience, the floor could therefore be designed in such a way that it slopes down from the centroid of its surface area towards at least one slidable sidewall. This further has the advantage that materials, such as for example a spilled pulverous dosage material, slides towards the sidewall and out of the side of the weighing compartment. Spilled liquids likewise can run to the side and out of the weighing compartment. A catch channel or catch basin for spilled dosage material may optionally be arranged in the floor in the vicinity of the border edge.

Accessibility can be improved even further by giving the top cover a shape that is analogous to the floor. Accordingly, the top cover is designed so that it slopes down from the at least one horizontally sliding sidewall towards the centroid of the top cover.

If the front wall consists of a transparent material, the visibility into the weighing compartment can be improved with a design of the top cover that slopes down from the front wall towards the centroid of the top cover. An analogous design is of course also possible for the floor. Furthermore, the floor and the top cover can also be given an analogously sloped shape towards the rear wall.

The draft protection device according to the invention can be used in the most diverse kinds of laboratory instruments. The laboratory instrument can for example be a balance, a dosage-dispensing instrument, or a pipetting- or titrating device.

As also described above, the laboratory instrument can include a dosage-dispensing device. The dosage-dispensing device may be arranged above the top cover, and its delivery orifice for dosage material is preferably aligned with the opening.

Of course, the dosage-dispensing device can also reach at least partially through the opening, so that the delivery orifice for the dosage material is positioned inside the weighing compartment below the top cover of the draft protection device.

If a drive mechanism is used for the vertical movement of the top cover or for the height adjustment of parts of the draft protection device, there is preferably a sensor device arranged inside the laboratory instrument whereby at least the height of a receiving container can be detected after being set on the balance pan.

In one possible embodiment, the sensor device can include two laser diodes and two photo cells arranged so that the rays emitted by the two laser diodes cross each other directly below the opening or the delivery orifice of the dosage-dispensing device.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Figure 1:
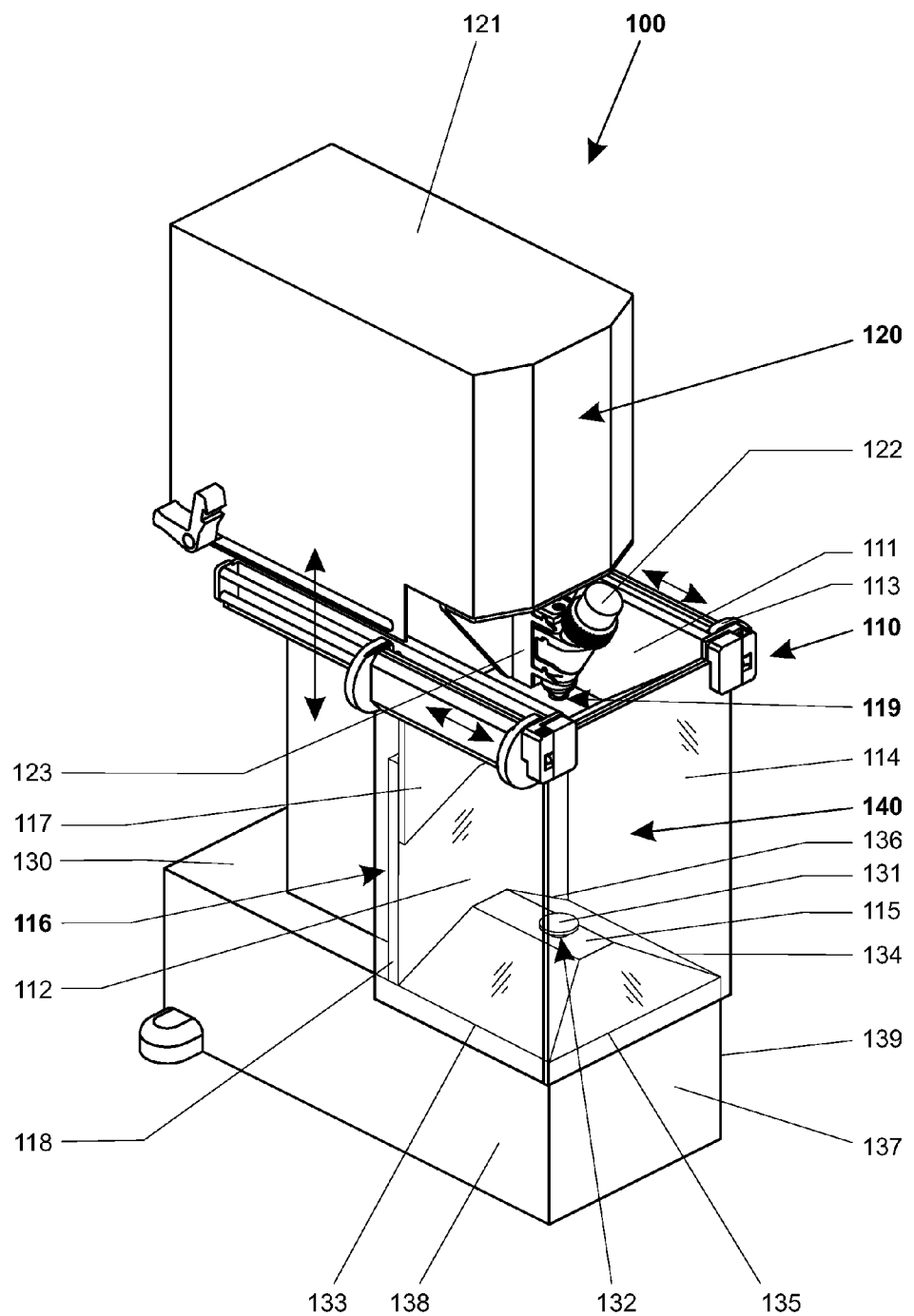
FIG. 1 is a three-dimensional view of a laboratory instrument with a dosage-dispensing device, and with a first embodiment of a draft protection device according to the present invention having a vertically movable top cover to which both sidewalls, the front wall and a part of the rear wall are connected, wherein the illustrated position of the top cover corresponds to its largest possible distance from the floor.

FIG. 1 shows one exemplary embodiment of a laboratory instrument 100 with a dosage-dispensing device 120 and with a draft protection device 110 according to the present invention. The draft protection device 110 includes a top cover 111, a floor 115 delimited by border edges 133, 134, 135, 136, a first sidewall 112 and a second sidewall 113, a front panel 114 and a divided rear wall 116. The draft protection device 112 encloses a weighing compartment 140.

The draft protection device 110 is shown in FIG. 1 in a closed state, and since the sidewalls 112, 113 and the front wall 114 are made of transparent material, the view into the weighing compartment 140 enclosed by the draft protection device 110 is free from three sides. Both of the sidewalls 112, 113 are slidable relative to the top cover 111 in a linear horizontal movement. The linear guiding constraints associated with such movement will be covered in more detail in the context of FIG. 2.

The floor 115 is solidly connected to a console housing 130 of the laboratory instrument 100. Inside the console housing 130 is arranged a weighing cell (not shown in the drawing) whose load-receiving part is connected by means of a load-transmitting element (not shown) to a balance pan 131 that is arranged above the floor 115 and thus inside the weighing compartment 140. As shown, the floor 115 slopes down from its center towards the two sidewalls 112, 113 and the front wall 114. This does not preclude the possibility that individual surface areas of the floor 115 could also extend horizontally, as is shown in FIG. 1. The center of the floor 115 has a passage opening 132 to allow the load-transmitting element (not visible because of the balance pan 131) to pass through the floor 115 into the weighing compartment 140.

Like the floor 115, the top cover 111 has been given a comparable design in the shape of a truncated pyramid, but in an inverted position. In place of the passage opening 132, the top cover 111 has an opening 119. This opening 119 can be adapted to a dosage-dispensing head 122 as described herein farther below.

The divided rear wall 116 extends in its width over the entire adjacent border edge 136 of the floor 115 and includes a first rear wall panel 117 and a second rear wall panel 118, wherein the first rear wall panel 117 is solidly connected to the top cover 111 and the second rear wall panel 118 is solidly connected to the floor 115 and to the console housing 130. The two rear wall panels 117, 118 are arranged in such a way relative to each other that their surfaces lie against each other and the panels partially overlap, but are nevertheless vertically movable relative to each other.

The top cover 111 and the walls connected to it are slidable in the vertical direction relative to the console housing 130. For this to be possible, it is necessary that the front wall 114 and the two sidewalls 112, 113 can be moved vertically past the respectively adjacent border edges 133, 134, 135 of the floor 115 and past the housing walls 137, 138, 139 adjoining, in respective order, the border edges 133, 134, 135. The housing walls 137, 138, 139 of the console housing 130 are therefore preferably designed as substantially vertical surfaces, with the sidewalls 112, 113 and the front wall 114 partially overlapping the housing walls 137, 138, 139. The height of the console housing 130 preferably matches the vertical displacement height of the top cover 111 relative to the floor 115 or relative to the balance pan 131. If a supporting surface (not shown) for the laboratory instrument 100, for example a laboratory table, has suitable recesses to receive the front wall 114 and the sidewalls 112, 113 when the top cover 111 is moved downward, one could also choose a lower height for the console housing 130.

The dosage-dispensing device 120 of FIG. 1 has a drive- and control unit (not shown) that is arranged in a dosage-dispensing device housing 121. A dispensing head 122 is releasably mounted in a dispensing head holder 123 of the dosage-dispensing device 120 and can be coupled to the drive- and control unit. Further, a part of the dispensing head 122 reaches into or through the opening 119 into the weighing compartment 140. The opening 119 is matched to the corresponding profile section of the dispensing head 122, which is located in the area of the opening 119 when the dispensing head is set into the dispensing head holder 123. This serves to prevent air drafts of the ambient atmosphere from entering through the opening 119 into the weighing compartment 140. Depending on the design of the dispensing head 122 and the opening 119 in the top cover 111, it may also be possible to omit the dispensing head holder 123.

Preferably, at least the dispensing head 122 or, as shown in FIG. 1, the entire dosage-dispensing device 120 is therefore connected to the top cover 111 and follows the vertical movements of the top cover 111. The position of the top cover 111 shown in FIG. 1 corresponds to its largest possible distance from the floor 115.

Figure 2:
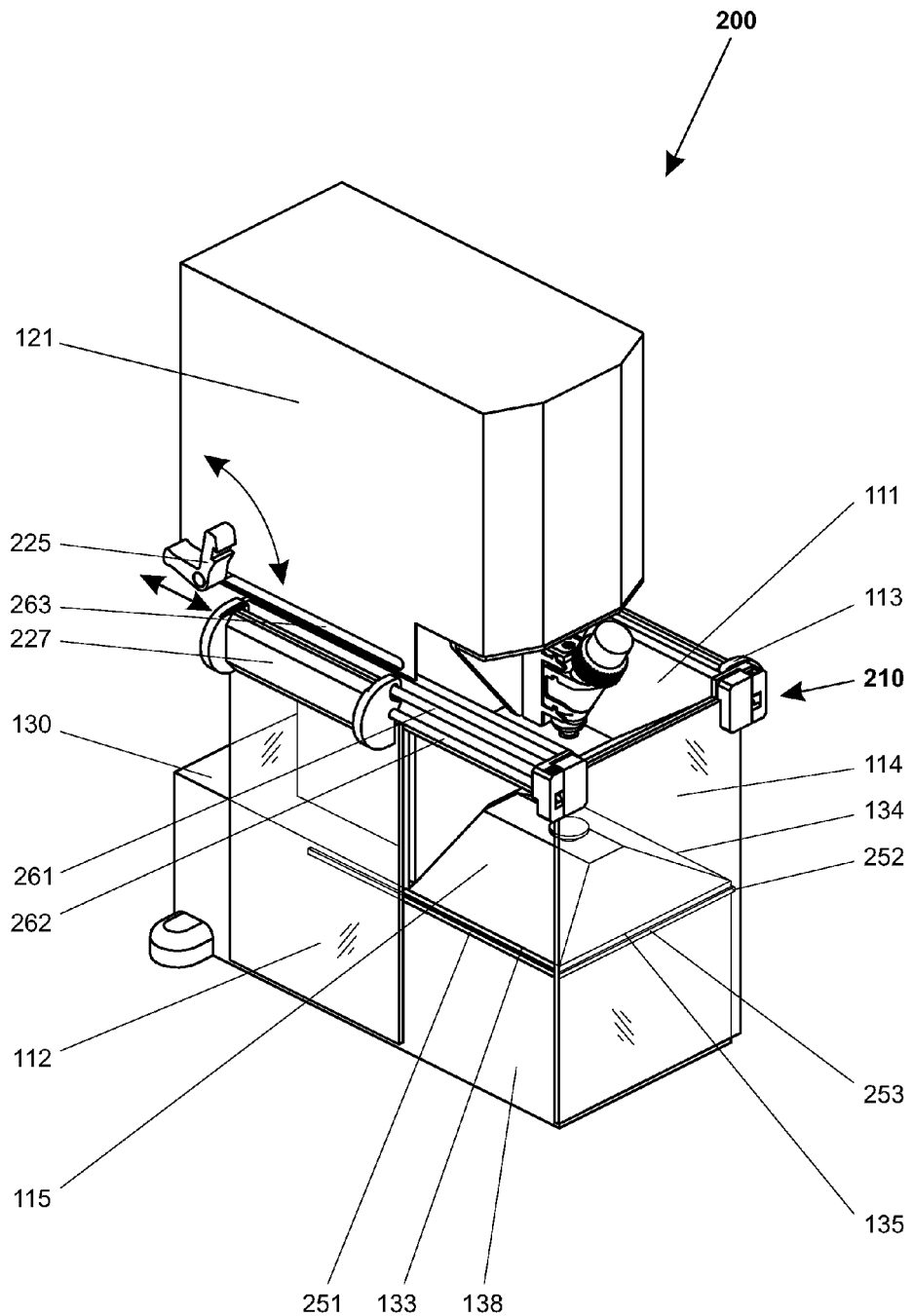
FIG. 2 shows the laboratory instrument of FIG. 1 with one sidewall opened, wherein the illustrated position of the top cover corresponds to its smallest possible distance from the floor.

FIG. 2 shows a laboratory instrument 200, which is substantially identical to the laboratory instrument 100 of FIG. 1. Unlike in FIG. 1, the draft protection device 210 of the laboratory instrument 200 in FIG. 2 is shown with the first sidewall 112 in the open state, and the position of the top cover 111 corresponds to its smallest possible distance from the floor 115.

The first sidewall 112 is equipped with a guide element 227 that is guided in linear movement along a first guide rail 261 and a second guide rail 262 that runs parallel to the first guide rail. Both of the guide rails 261, 262 are solidly connected to the top cover 111 and extend parallel to the first housing wall 138.

As the draft protection device 210 of the laboratory instrument 200 should as much as possible block all ambient air movements that occur around the laboratory instrument 200, the border edge 133 which faces towards the first sidewall 112 is equipped with a first sealing glide strip 251. Likewise, there is a second sealing glide strip 252 arranged between the second sidewall 113 and the adjacent border edge 134, and a third sealing glide strip 253 between the front wall 114 and the adjacent border edge 135. As shown in FIG. 2, the first sealing glide strip 251, which is in contact with the first sidewall 112, extends over almost the entire first housing wall 138 of the console housing 130. This sealing strip serves to seal a possible gap between the border edge 133 of the floor 115 and the first sidewall 112 and to allow a smooth gliding movement of the first sidewall 112 relative to the border edge 133, so that the first sidewall 112 is not being scratched. The second and third sealing guide strips 252, 253 may be similarly arranged to interact with their respective walls 113, 114.

FIG. 2 further shows a first take-along latch 225 in the shape of an angled lever. The take-along latch can be moved along a linear path that is formed by a slot 263 in the dosage-dispensing device housing 121 and runs parallel to the guide rails 261, 262. Linear movement occurs of the take-along latch 225 by means of a drive mechanism (not shown in this view), which is arranged inside the dosage-dispensing device housing 121. This drive mechanism will be covered below in more detail within the context of FIG. 4. The first take-along latch 225 can be coupled to the guide element 227 through a simple swivel movement, whereby the linear movement of the first take-along latch 225 is imparted to the first sidewall 112. Analogously, there can be a second take-along latch for the second sidewall 113, in which case both take-along latches are moved synchronously by the drive mechanism. When it is not coupled to the first take-along latch 225, the first sidewall 112 can be moved manually.

Figure 3:
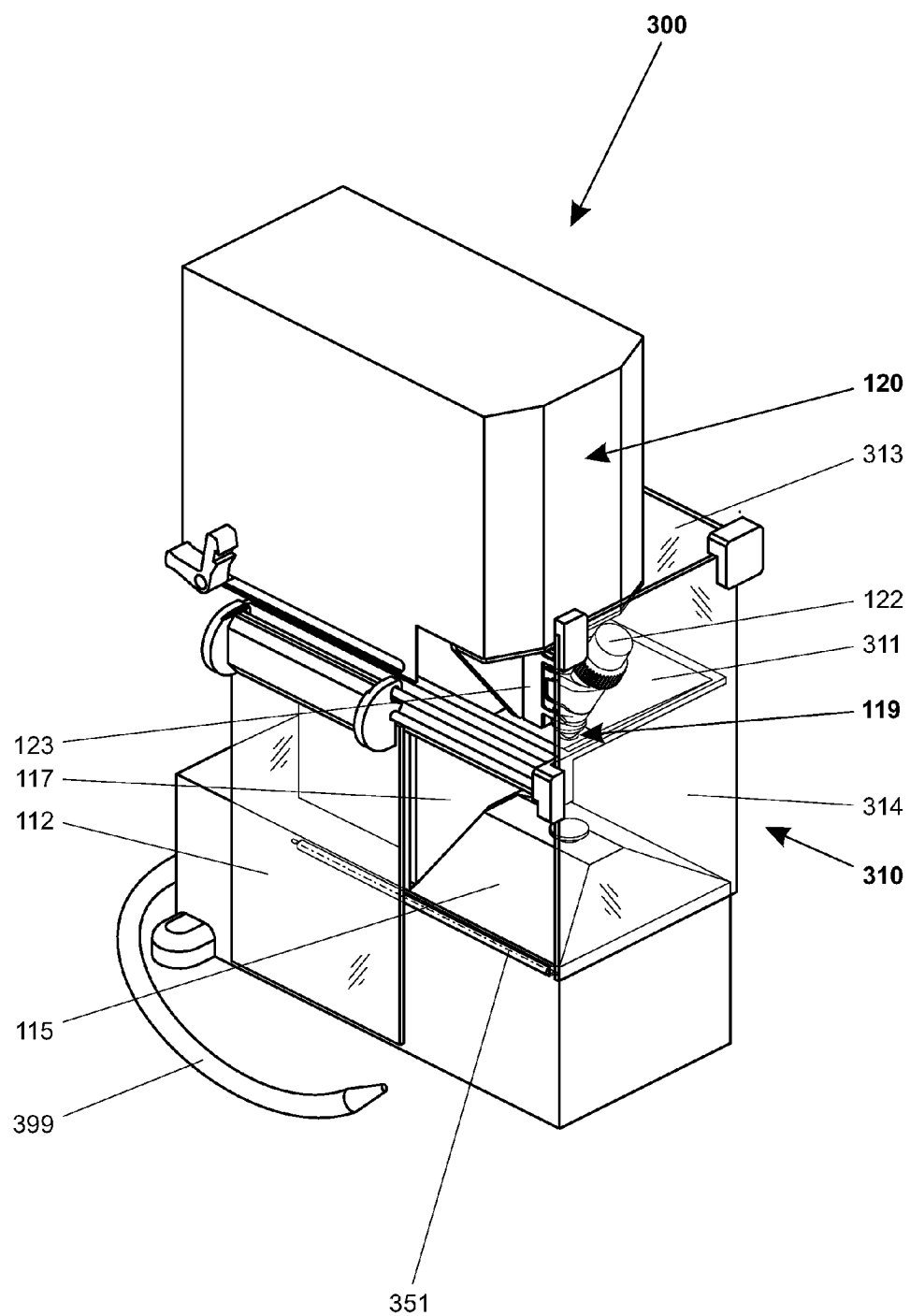
FIG. 3 is a three-dimensional view of a laboratory instrument with a dosage-dispensing device and with a second embodiment of a draft protection device according to the present invention having a vertically movable top cover to which one sidewall and a part of the rear wall are connected, while the second sidewall and the front wall are connected to the floor.

FIG. 3 shows a three-dimensional representation of a laboratory instrument 300 with a dosage-dispensing device 120 as already known from FIGS. 1 and 2. The laboratory instrument 300 is further equipped with a draft protection device 310 according to a second embodiment of the invention, wherein the vertically movable top cover 311 is connected to a first sidewall 112 and a first rear wall panel 117. Different from the laboratory instruments of FIGS. 1 and 2, the second sidewall 313 and the front wall 314 are solidly connected to the floor 115. Furthermore, in place of a sealing glide strip, a sealing roller 351 is arranged at the border edge facing towards the first sidewall 112.

In FIG. 3, the draft protection device 310 of the laboratory instrument 300 is shown with the first sidewall 112 again in the open state, and the position of the top cover 311 corresponding to its minimal possible distance from the floor 115. Although it is more difficult with this second embodiment to set a dispensing head 122 into the dispensing head holder 123 of the dosage-dispensing device 120, there is still adequate access to the dispensing head holder 123 or to the opening 119, as the top edge of the first sidewall 112 always lies at the same height as the top cover 311. This second embodiment has the advantage that when taking out the dispensing head 122, a person operating the apparatus still has a certain degree of protection against dosage material that could possibly stick to the dispensing head, as the front wall 314 and the second sidewall 313, by rising above the top cover 311, form a transparent mechanical protection barrier. When the dispensing head 122 is removed, the delivery orifice can thus be visually inspected immediately above the top cover 311, and if necessary it can be cleaned with a flexible suction device 399 before the dispensing head 122 is completely removed from the laboratory instrument 300.

In variant versions of the embodiments shown in FIGS. 1 to 3, it is of course also possible that only the front wall, or only the two side walls, or the front wall and one of the sidewalls are connected to the top cover. Conceivably, the fastening means of the walls could also be designed in such a way that they can be connected either to the top cover or to the floor, whichever is desired. As an additional possibility, the sidewalls which are connected to the floor can also be designed with the ability to slide in linear movement.

Figure 4:
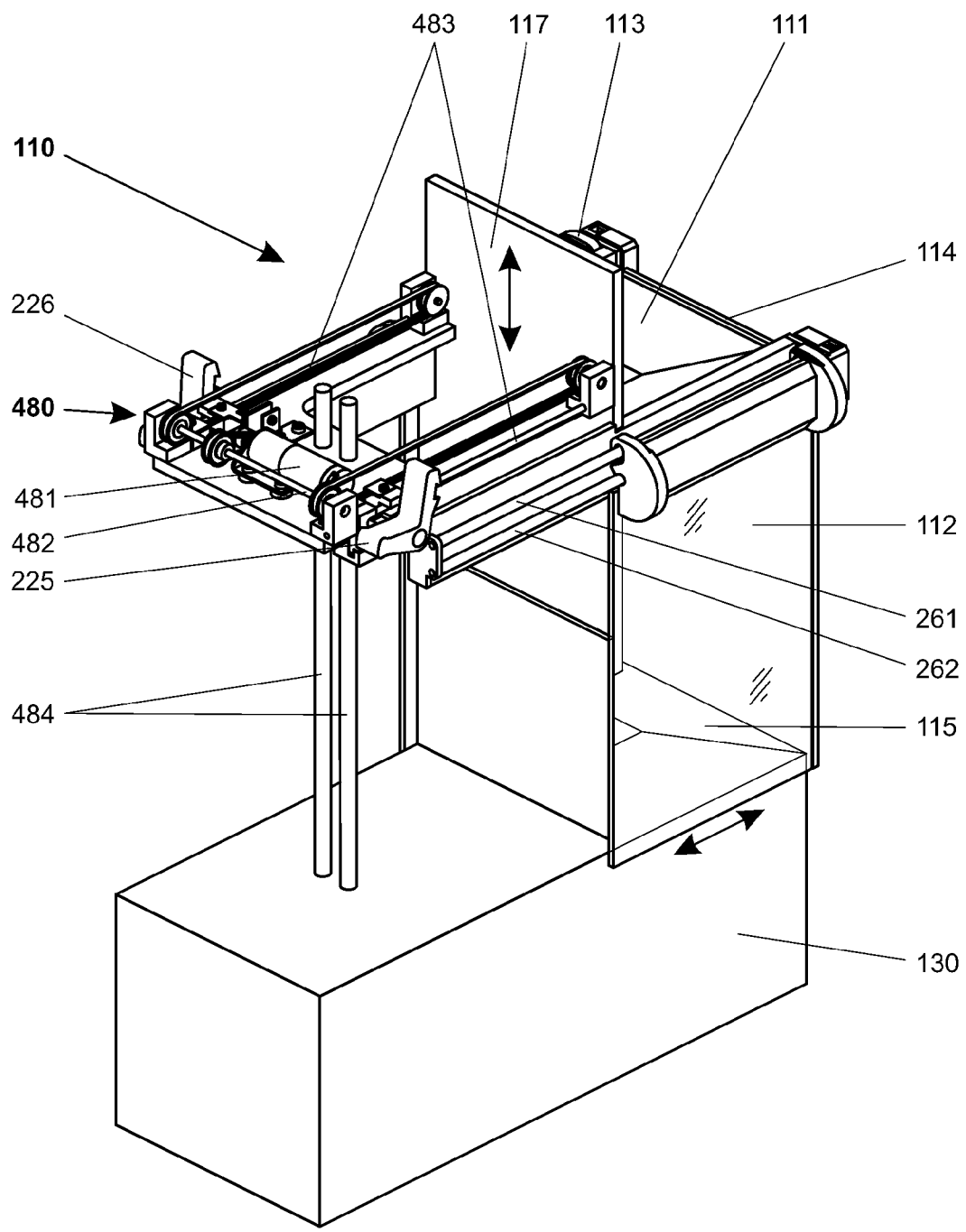
FIG. 4 is a three-dimensional view of a draft protection device according to the present invention with a drive mechanism for both sidewalls and with linear guides for the vertical movement of the top cover and the walls.

FIG. 4 shows a three-dimensional view directed from the rear of the draft protection device 110. All of the housing panels and the entire dosage-dispensing device have been removed in order to more clearly show certain details of the drive mechanism 480 which has already been mentioned above. Only the console housing 130 is still shown in this drawing in order to better illustrate the vertical guide mechanism of the top cover 111 and the two sidewalls 112, 113 and the front wall 114, which are connected to the top cover 111, as the console housing 130 simultaneously forms the base of the floor 115.

The drive mechanism 480 has a motor 481 whose rotation is transmitted by way of a belt gearing device 482 into a linear movement of the first take-along latch 225 and a second take-along latch 226. As shown in this particular example, the belt gearing device 482 includes a main drive shaft located near a first end of a pair of longitudinal guiding constraints 483, the main drive shaft being coupled to the motor 481 by a motor drive belt and associated drive pulley. Pulleys at each end of the main drive shaft may be coupled, such as by the toothed drive belts shown, to corresponding pulleys located near the opposite ends of the longitudinal guiding constraints 483. Bearings may be provided to facilitate rotation of the pulleys. By means of this drive mechanism 480, the take-along latches 225, 226 may be driven along a linear path that follows the longitudinal guiding constraints 483.

More particularly, both take-along latches 225, 226 are guided on the longitudinal guiding constraints 483 that run parallel to the guide rails 261, 262 of the horizontally slidable sidewalls 112, 113. The take-along latches 225, 226 can also be coupled independently of each other to their respective associated sidewalls 112, 113.

Furthermore, two vertical guides 484 are shown schematically in FIG. 4 in order to illustrate the vertical mobility of the top cover 111, as well as the elements connected to the latter, i.e., the sidewalls 112, 113, the front wall 114, the first rear wall panel 117 and the drive mechanism 480. The draft protection device 110 also has a drive unit for providing such vertical movement, but for the sake of clarity the vertical drive mechanism is not shown here.

To make the draft protection device 110 easier to clean, it is advantageous if there is a simple way to remove at least the front wall 114 and the sidewalls 112, 113.

Figure 5:
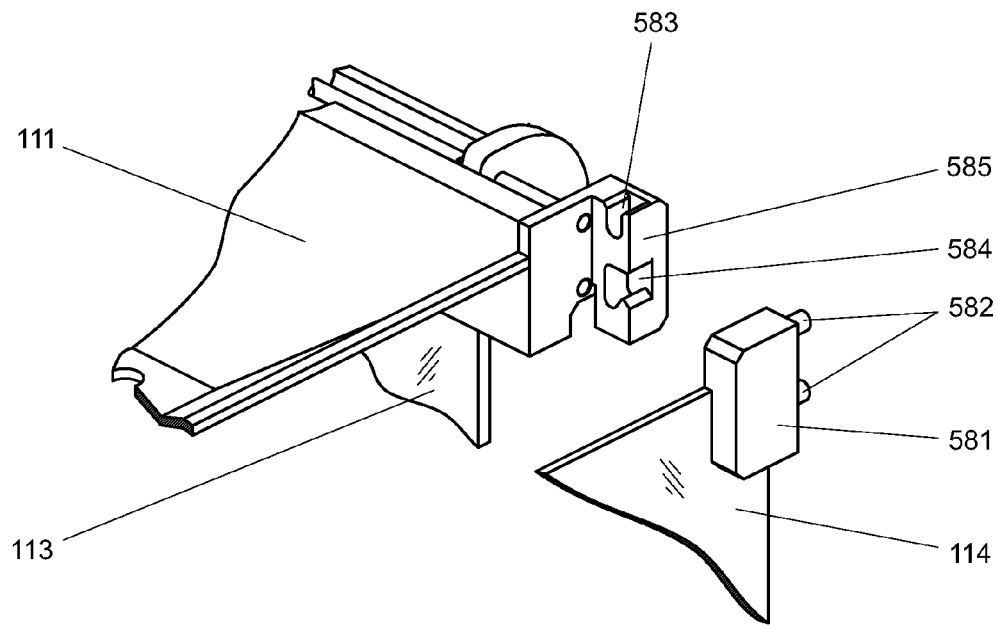
FIG. 5 is a three-dimensional detail view of a releasable front wall attachment.

To this end, FIG. 5 represents a three-dimensional detail view of a releasable fastening arrangement for the front wall (shown previously in FIG. 1, but not covered in the description). To conserve drawing space, only fragmentary portions are shown of the top cover 111, the second sidewall 113, and the front wall 114, which is separate from the top cover 111. To provide a releasable connection between the front wall 114 and the top cover 111, the corners of the front wall 114 that lie next to the top cover 111 have pin blocks 581 equipped with two pins 582 each. The two pins 582 can be engaged in two seating grooves 583, 584 that are formed in a holder 585 associated with the top cover 111. One of these holders 585 is arranged at each of the corners of the top cover 111 that face the front wall 114. A front wall 114 that is equipped with this front wall fastening arrangement can be released from or attached to the holders 585 with a single hand movement. Furthermore, due to the use of pin blocks 581 with two pins 582, the front wall is firmly positioned relative to the top cover 111 and cannot swing back and forth in the holders 585.

Figure 6:
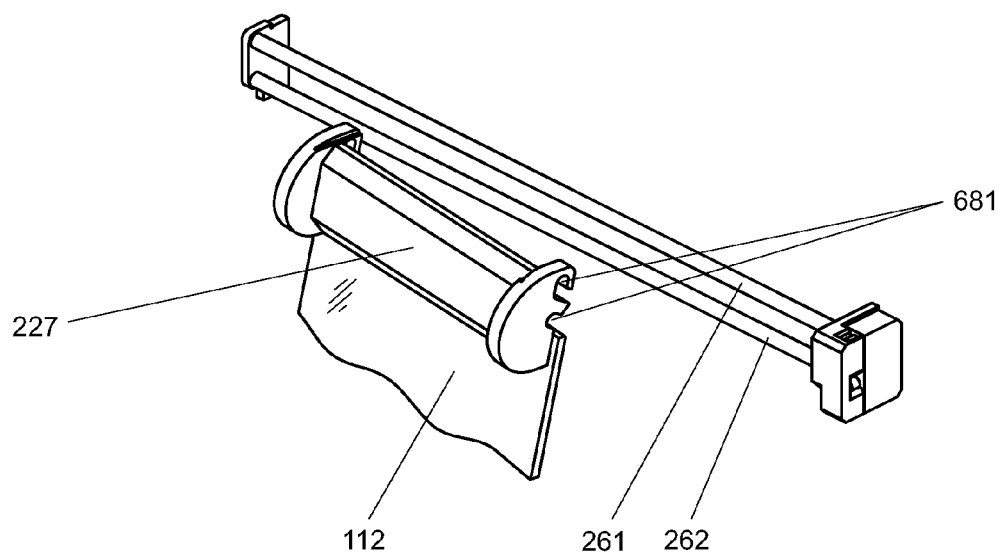
FIG. 6 is a three-dimensional detail view of a releasable sidewall attachment.

FIG. 6 shows a three-dimensional detail view of a releasable fastening arrangement for a sidewall (shown on the first sidewall 112 in the preceding figures, but not covered in the description). In this releasable fastening arrangement, the guide element 227 is provided with two slot-shaped recesses 681 oriented against the direction of gravity, so that the first sidewall 112 can be suspended from the first guide rail 261 and the second guide rail 262. As already mentioned in the case of the two pins of the front wall, the two guide rails 261, 262 lend stability to the suspended sidewall 112, so that the mobility of the latter is restricted to a horizontal sliding movement and to a swivel- and pull movement against the direction of gravity for the release from guide rails 261, 262.

Figure 7:
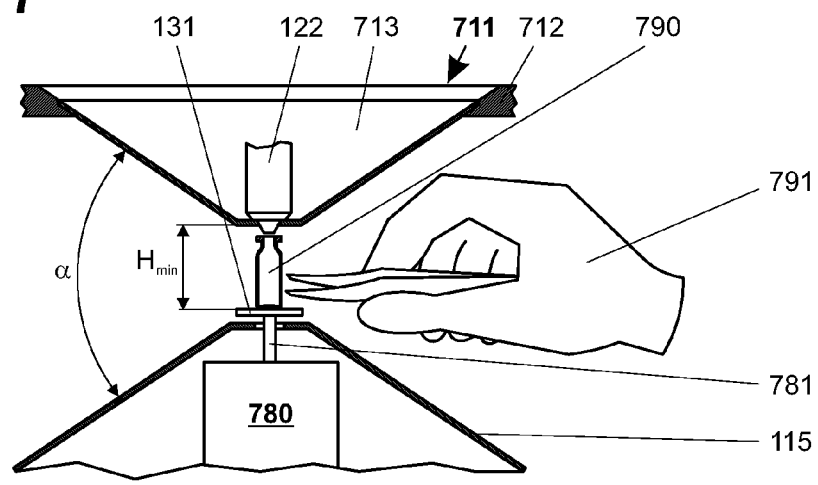
FIG. 7 is a detail view with the top cover and the floor shown in cross-section, wherein a receiving container with a small overall height is standing on a balance pan of the instrument.

FIG. 7 shows a cross-sectional detail view of a draft shield top cover 711 arranged above the floor 115 shown in FIG. 1. The top cover 711 is nearly identical to the top cover 111 of FIG. 1, except that the top cover 711 of FIG. 7 has a top cover frame 712 and a top cover insert 713. The top cover insert 713 is loosely seated in the top cover frame 712 so that it can be easily removed from the draft shield for cleaning. Also shown in FIG. 7 is a dispensing head 122 which is seated in the top cover 711 or, if applicable, in the top cover insert 713. A balance pan 131, a load-transmitting element 781 and part of a schematically indicated weighing cell 780 are also depicted. Of course, the dispensing head 122 can also be solidly connected to the top cover insert 713.

A receiving container 790 is shown standing on the balance pan 131. This receiving container 790 is the smallest size possible, as its overall height is nearly equal to the minimal distance $H_{min}$ of the top cover 711 from the balance pan 131, wherein the part of the dispensing head 122 that reaches through the top cover 711 also has to be taken into account.

Also evident from FIG. 7 is the primary reason for the pyramid-shaped designs of the floor 115 and the top cover 711. That is due to the shapes of the floor 115 and the top cover 711 with strongly sloped surfaces, the exchange of a receiving container 790 is still possible without a problem, as indicated schematically by the image of a hand 791 holding a pair of tweezers. Of course, the ease of access depends on the degree of the angle $\alpha$ that exists between the sloping parts of the floor 115 and the top cover 711. In addition, this arrangement makes it easier to observe the receiving container 790 on the balance pan 131. Furthermore, these shapes of the floor 115 and the top cover 711 are better suited to keep air currents away from the balance pan 131 and the receiving container 790, so that a weighing result is available from the weighing cell 780 in a shorter time.

Figure 8:
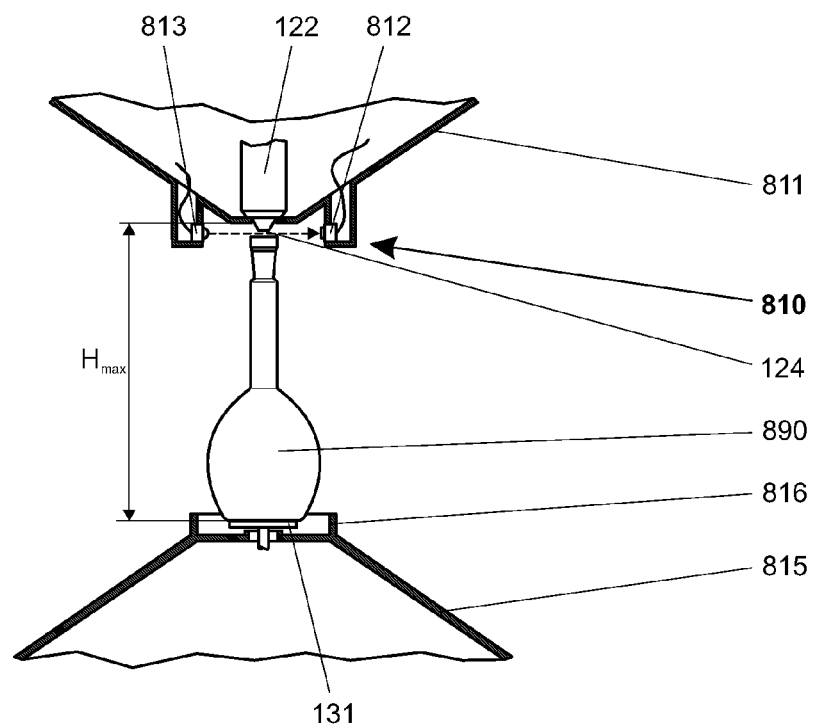
FIG. 8 is a detail view with the top cover and the floor again shown in cross-section, wherein a receiving container with a large overall height is standing on the balance pan and the top cover has an associated sensor device.

Like FIG. 7, FIG. 8 also shows a detail view of a draft shield top cover 811 and floor 815 in cross-section. A receiving container 890 is shown standing on the balance pan 131 and has an overall height almost equal to the maximum distance $H_{max}$ that can exist between the top cover 811 and the balance pan 131.

However, the top cover 811 and the floor 815 in FIG. 8 differ from those elements in FIG. 7 in that they have further supplemental features that enhance the operation of the laboratory instrument according to the present invention. For example, a draft barrier ring 816 is formed on the floor 815 to protect the balance pan 131 against air currents that rise up along the sloping parts of the floor 815. As an alternative to the draft barrier ring 816, the balance pan 131 may be recessed far enough into the floor 815, so that the top edge of the floor 815 is substantially flush with the load-carrying surface of the balance pan 131.

As a further feature, the top cover 811 includes a sensor device 810 by means of which the position of the top rim and possibly also the position of the fill opening of a receiving container 890 can be determined. As a representation of such a sensor device 810, FIG. 8 shows a laser diode 813 and a photodiode 812, wherein the signals of the photodiode 812 are sent to a controller device (not shown) of the laboratory instrument, which controls the drive mechanism for the vertical movement of the top cover 811. A more accurate detection is possible with an arrangement of two laser diodes 811 and two photocells 812, wherein the rays of the laser diodes preferably cross each other slightly below the delivery orifice 124 of the dispensing head 122.

Of course there are a multitude of other known sensor devices 810 that could be used, such as for example image-processing systems, Hall sensors, inductive and capacitive proximity switches, ultrasound sensors and the like.

Figure 9:
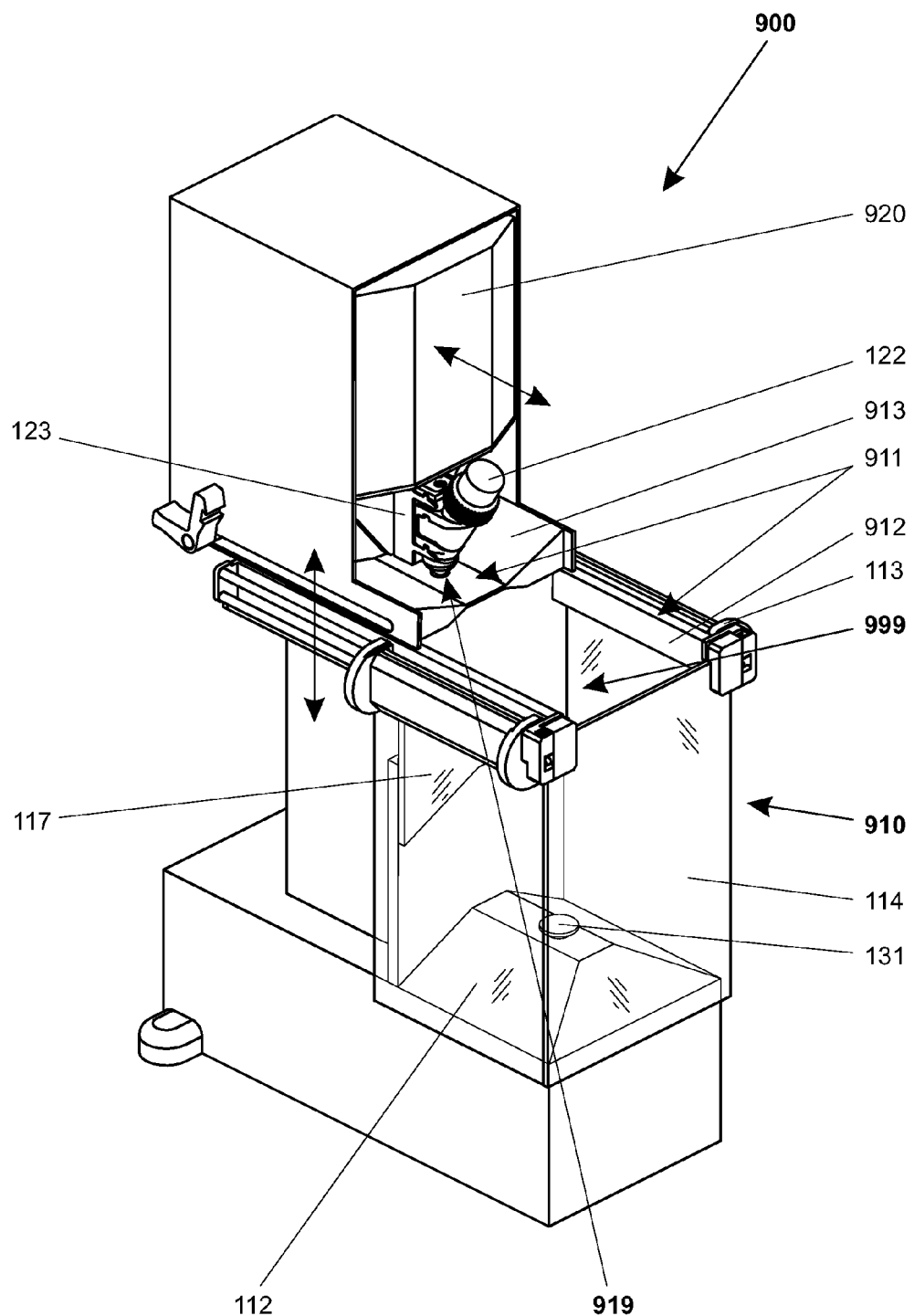
FIG. 9 is a three-dimensional view of a laboratory instrument with a dosage-dispensing device and with a third embodiment of a draft protection device according to the present invention, wherein the top cover is divided into a top cover frame and a top cover insert that is horizontally slidable relative to the top cover frame.

In a three-dimensional representation, FIG. 9 shows a laboratory instrument 900 with a dosage-dispensing device 920 and with a third embodiment of a draft protection device 910 of the present invention. This draft protection device 910 includes a top cover 911 that is divided into a top cover frame 912 and a top cover insert 913. An opening 919 is arranged in the top cover insert 913. A dispensing head 122 is seated in a dispensing head holder 123. The bottom part of the dispensing head 122 with the delivery orifice reaches through the opening 919 into the weighing compartment.

As a further feature of this embodiment, the top cover insert 913 and the dosage-dispensing device 920 that is connected thereto, are horizontally movable relative to the top cover frame 912. As a result, an upward-facing opening 999 of the draft shield can be exposed, so that a receiving container (not shown) can also be set down on and removed from the balance pan 131 from above. This can be accomplished with a suitable loading device, preferably a robot arm.

In this embodiment the two sidewalls 112, 113, the front wall 114 and the first rear wall panel 117 are connected to the top cover frame 912. The top cover frame 912, the top cover insert 913, the dosage-dispensing device 920, and the walls 112, 113, 114, 115 connected to the top cover frame 912, move up and down together relative to the balance pan 131.

List of Reference Symbols Used Herein

900, 300, 200, 100 laboratory instrument
910, 410, 310, 210, 110 draft protection device
911, 811, 711, 311, 111 top cover
112 first sidewall
313, 113 second sidewall
314, 114 front wall
815, 115 floor
116 rear wall
117 first rear wall panel
118 second rear wall panel
919, 119 opening
920, 120 dosage-dispensing device
121 dosage-dispensing device housing
122 dispensing head
123 dispensing head holder
124 delivery orifice
130 console housing
131 balance pan
132 passage opening
133 border edge facing the first sidewall
134 border edge facing the second sidewall
135 border edge facing the front wall
136 border edge facing the rear wall
137 third housing wall
138 first housing wall
139 second housing wall
140 weighing compartment
225 first take-along latch
226 second take-along latch
227 guide element
251 first sealing glide strip
252 second sealing glide strip
253 third sealing glide strip
261 first guide rail
262 second guide rail
263 slot
351 sealing roller
399 suction device
480 drive mechanism
481 motor
482 toothed belt drive
483 longitudinal guide
484 vertical guide
581 pin block
582 pin
584, 583 seating groove
585 holder
681 recess
912, 712 top cover frame
913, 713 top cover insert
780 weighing cell
781 load-transmitting element
890, 790 receiving container
791 hand
810 sensor device
812 photodiode
813 laser diode
816 draft barrier ring
999 opening Although the present invention has been described by presenting specific examples of embodiments, it is considered obvious that numerous further variant embodiments can be created from a knowledge of the present invention, for example by combining the features of the individual embodiments with each other and/or interchanging individual functional units of the embodiments described in the examples. Among other possibilities, other embodiments of the inventive concept are contemplated where for example the top cover has an opening exactly matched to the fill opening, so that dosage material could also be dispensed manually through the opening. Of course, dosage-dispensing devices for solid substances as well as dosage-dispensing devices for liquids can be employed with the draft protection device according to the invention. Temperature sensors, stirring mechanisms and other devices can also be introduced through the opening into the receiving container.

Therefore, while certain embodiments of the present invention are described in detail above, the scope of the invention is not to be considered limited by such disclosure, and modifications are possible without departing from the spirit of the invention as evidenced by the following claims:

What is claimed is:

1. A draft protection device for a laboratory instrument, the device enclosing a weighing compartment surrounding a balance pan and comprising:
    a floor delimited by border edges;
    a rear wall;
    a front wall;
    two sidewalls;
    a top cover with at least one opening, the top cover connected to at least one of the two sidewalls, the front wall, and the rear wall such that the top cover and the wall(s) connected thereto are together moveable up and down relative to the balance pan, the wall(s) connected to the top cover being vertically movable past a respective adjacent border edge(s) of the floor; and
    at least one drive mechanism for producing vertical movement of the top cover and the wall(s) connected thereto;
    wherein, in any vertical position of the top cover, at least one sidewall is also slidable in a substantially horizontal direction relative to the top cover.

2. The draft protection device of claim 1, wherein the top cover is connected to both sidewalls, the side walls being horizontally slidable relative to the top cover.

3. The draft protection device of claim 1, wherein the top cover is connected to each of the two sidewalls, the front wall, and the rear wall.

4. The draft protection device of claim 1, wherein at least one of the two sidewalls and the front wall is releasably connected to the top cover.

5. The draft protection device of claim 1, wherein the at least one opening in the top cover is closeable by means of a slider located in the top cover.

6. The draft protection device of claim 1, wherein at least one guide rail is arranged along the top cover to provide for horizontal guidance of at least one slidable sidewall that is connected to the top cover, the at least one slidable sidewall having at least one guide element constrained to slide along the guide rail.

7. The draft protection device of claim 1, wherein the top cover further comprises a top cover frame and a top cover insert, with the at least one opening located in the top cover insert.

8. The draft protection device of claim 7, wherein one or more of the at least one sidewall, the front wall and the rear wall are connected to the top cover frame, the top cover frame with the top cover insert and the walls connected thereto are vertically slidable relative to the balance pan, and the top cover insert is horizontally slidable relative to the top cover frame.

9. The draft protection device of claim 7, wherein the top cover frame is connected to both sidewalls, the side walls being horizontally slidable relative to the top cover frame.

10. The draft protection device of claim 7, wherein at least one of the sidewalls and the front wall is releasably connected to the top cover frame.

11. The draft protection device of claim 7, wherein the top cover insert is loosely set into the top cover frame.

12. The draft protection device of claim 7, wherein the at least one opening in the top cover insert is closeable by means of a slider located in the top cover insert.

13. The draft protection device of claim 7, wherein at least one guide rail is arranged along the top cover frame to provide for horizontal guidance of at least one slidable sidewall that is connected to the top cover frame, the at least one slidable sidewall having at least one guide element constrained to slide along the guide rail.

14. The draft protection device of claim 1, further comprising a sealing element extending substantially the length of one or more of the border edges, each sealing element located on a housing wall near a border edge of the floor.

15. The draft protection device of claim 1, further comprising at least one drive mechanism for producing horizontal movement of at least one sidewall.

16. The draft protection device of claim 1, wherein the floor is shaped to slope downward from a centroid of its surface area towards at least one of the sidewalls.

17. The draft protection device of claim 1, wherein the top cover is shaped to slope downward from one or more of the front wall and sidewalls towards a centroid of its surface area.

18. The draft protection device of claim 1, wherein the device is adapted for installation to and use with a laboratory instrument selected from the group consisting of a balance, a dosage-dispensing instrument, a pipetting device, and a titrating device.

19. A laboratory instrument, comprising:
    a draft protection device of claim 1; and
    a dosage-dispensing device arranged so that its delivery orifice for dosage material is arranged above the top cover, in alignment with the opening.

20. The laboratory instrument of claim 19, further comprising a sensor device that is useable to detect the height of a receiving container set on a balance pan thereof.

21. The laboratory instrument of claim 20, wherein the sensor device includes two laser diodes and two photo cells, the rays emitted by the laser diodes crossing each other immediately below the opening or the delivery orifice.

22. A laboratory instrument, comprising:
    a draft protection device of claim 1; and
    a dosage-dispensing device arranged so that its delivery orifice for dosage material reaches through the opening and into the weighing compartment.

23. The laboratory instrument of claim 22, further comprising a sensor device that is useable to detect the height of a receiving container set on a balance pan thereof.

24. The laboratory instrument of claim 23, wherein the sensor device includes two laser diodes and two photo cells, the rays emitted by the laser diodes crossing each other immediately below the delivery orifice.

25. A draft protection device for a laboratory instrument, the device enclosing a weighing compartment surrounding a balance pan and comprising:
    a floor delimited by border edges;
    a rear wall;
    a front wall;
    two sidewalls;
    a top cover with at least one opening, the top cover connected to at least one of the two sidewalls, the front wall, and the rear wall such that the top cover and the wall(s) connected thereto are together moveable up and down relative to the balance pan, the wall(s) connected to the top cover being vertically movable past a respective adjacent border edge(s) of the floor; and
    at least one drive mechanism for producing horizontal movement of at least one sidewall;

wherein, in any vertical position of the top cover, at least one sidewall is also slidable in a substantially horizontal direction relative to the top cover.

26. A draft protection device for a laboratory instrument, the device enclosing a weighing compartment surrounding a balance pan and comprising:
- a rear wall;
- a front wall;
- two sidewalls;
- a floor delimited by border edges, the floor sloping downward from a centroid of a surface area thereof towards at least one of the sidewalls; and
- a top cover with at least one opening, the top cover connected to at least one of the two sidewalls, the front wall, and the rear wall such that the top cover and the wall(s) connected thereto are together moveable up and down relative to the balance pan, the wall(s) connected to the top cover being vertically movable past a respective adjacent border edge(s) of the floor;
- wherein, in any vertical position of the top cover, at least one sidewall is also slidable in a substantially horizontal direction relative to the top cover.

27. A draft protection device for a laboratory instrument, the device enclosing a weighing compartment surrounding a balance pan and comprising:
- a rear wall;
- a front wall;
- two sidewalls;
- a floor delimited by border edges; and
- a top cover with at least one opening, the top cover connected to at least one of the two sidewalls, the front wall, and the rear wall such that the top cover and the wall(s) connected thereto are together moveable up and down relative to the balance pan, the wall(s) connected to the top cover being vertically movable past a respective adjacent border edge(s) of the floor, the top cover sloping downward from one or more of the front wall and sidewalls towards a centroid of a surface area thereof;
- wherein, in any vertical position of the top cover, at least one sidewall is also slidable in a substantially horizontal direction relative to the top cover.

* * * * *